United States Patent [19]

Patten

[11] 4,387,141

[45] Jun. 7, 1983

[54] X-RAY SCREENS BASED ON PHOSPHOR MIXTURES OF $CAWO_4$ AND RARE EARTH TANTALATES

[75] Inventor: Stanley H. Patten, Towanda, Pa.

[73] Assignee: E. I. Du Pont de Nemours and Company, Wilmington, Del.

[21] Appl. No.: 377,374

[22] Filed: May 12, 1982

[51] Int. Cl.[3] ........................ C09K 11/475; G01T 1/00

[52] U.S. Cl. ................................ 428/690; 250/483.1; 252/301.4 R; 252/301.5; 428/702

[58] Field of Search ..................... 252/301.5, 301.4 R; 250/483.1; 408/690, 702

[56] References Cited

U.S. PATENT DOCUMENTS

| | | | |
|---|---|---|---|
| 3,338,841 | 8/1967 | Brixner | 252/301.5 X |
| 3,940,347 | 2/1976 | Faria et al. | 252/301.5 |
| 4,054,799 | 10/1977 | Wolfe et al. | 252/301.5 |
| 4,225,653 | 9/1980 | Brixner | 252/301.4 R X |

*Primary Examiner*—Jack Cooper

[57] ABSTRACT

X-ray intensifying screens with improved speed and image sharpness can be made from a phosphor mixture of calcium tungstate and yttrium tantalate. The tantalate phosphor may be further activated with rare earths.

3 Claims, 2 Drawing Figures

X-RAY SCREENS BASED ON PHOSPHOR MIXTURES OF $CAWO_4$ AND RARE EARTH TANTALATES

BACKGROUND OF THE INVENTION

Since shortly after the discovery of X-rays, an X-ray intensifying screen, also called an X-ray conversion screen, has been used to convert X-ray energy to a more useful UV-visible light. The key constituent of an X-ray conversion screen is a phosphor material which absorbs incident X-ray photons and produces in their stead photons of UV visible energy. Such screens are now used widely in industry and medicine. In use, the screen, mounted in a cassette, is placed directly in the X-ray beam and comes into immediate contact with a sheet of photosensitive film which is more sensitive to the light emitted by the phosphor screen than to the X-rays. Thus, an "intensified" image is produced on the film.

Conventionally, in the fabrication of an X-ray conversion screen, the phosphor is made by mixing solutions or slurries of the individual ingredients or simply grinding the ingredients together, followed by a high temperature firing in various atmospheres (e.g., nitrogen, hydrogen, etc.) to achieve the desired result. The phosphor is then mixed with a suitable binder, coated on a support, and dried. An overcoat may also be applied to protect the product during use and to add to the usable life of the finished X-ray conversion screen.

While there are many known materials which luminesce, few have the special properties necessary to make them useful in X-ray intensifying screens. For example, the most widely used phosphor for X-ray screens for many years has been calcium tungstate and the screens made therefrom have been used as a standard by which other phosphors and screens are judged. In recent years, a number of other phosphors have been proposed for possible use in X-ray screens. For example, Brixner, U.S. Pat. No. 4,225,653 proposes the use of a number of blue- or green-emitting phosphors based on M' structure yttrium, lutetium and gadolinium tantalates. These tantalates may be further activated with rare earth materials (e.g., niobium, thulium, terbium, etc.) and mixtures of the phosphors may also be used. When the phosphors of Brixner contain niobium or thulium, the emission will be mainly in the blue while the use of terbium results in green emission. Although screens prepared using the phosphor of Brixner are noticeably faster and sharper than conventional $CaWO_4$ screens, these new screens are noisier. The term "noise" in relationship to X-ray information theory applies to signals which do not carry useful information and the presence of which interferes with normal information transfer in the system. Noise is thus an objectionable phenomenon.

It is an object of this invention to provide a phosphor mixture suitable for making an X-ray intensifying screen with improved speed and sharpness and low noise.

SUMMARY OF THE INVENTION

This and other objects are achieved by providing an X-ray intensifying screen comprising a support, a phosphor mixture, on said support, and a binder for said phosphor mixture, characterized in that said phosphor mixture consists essentially of calcium tungstate to which is added 5% to 75% by weight of a rare earth tantalate having the monoclinic M' structure and selected from the group consisting of:

(a) $YNb_xTa_{1-x}O_4$, where x is 0 to about 0.15;

(b) $LuNb_xTa_{1-x}O_4$, where x is 0 to about 0.20;

(c) $Y_{1-y}Tm_yTaO_4$, where y is 0 to about 0.30;

(d) a solid solution of (a) and (b); and, (e) a solid solution of (a) and (c). Screens made from this mixture exhibit good speed and sharpness and low noise. This is a surprising result because altogether phosphor materials useful in the manufacture of X-ray conversion screens are legion in number, it is most uncommon to mix individual phosphors together for this purpose since the morphology, or crystal structure, of phosphors differs widely.

The composite preferred structure contains, in order, a support, a reflective layer, a fluorescent layer containing the mixed phosphors of this invention, and a protective layer. This structure is eminently useful as an X-ray conversion screen for use with conventional, blue-sensitive X-ray films because it produces sharp images with lower screen/film noise than conventional screens made from single phosphors such as the rare earth tantalates alone. Preferred embodiments of the X-ray screens of this invention are those in which the phosphor is $CaWO_4/YTaO_4$:Nb in a 70/30 or a 90/10 ratio in % by wt.

DETAILED DESCRIPTION OF THE INVENTION

In the practice of this invention, the phosphors are mixed with a suitable binder in a solvent prior to coating on a conventional X-ray screen support. Calcium tungstate is a luminescent material very old in the art; hence its manufacture requires no discussion. The rare earth tantalates useful in the practice of this invention are made according to the teachings of Brixner, U.S. Pat. No. 4,225,653. These materials are usually mixed in the desired amount in an appropriate solvent (e.g., a mixture of n-butyl acetate and n-propanol), and the resulting solution is mixed with a suitable binder (e.g., polyvinyl butyral) to form a suspension, and this is coated in a conventional manner on a typical support (e.g., polyethylene terephthalate). A reflective layer (e.g., $TiO_2$ dispersed in a suitable binder) may be interposed between the support and the phosphor layer. A protective layer may also be coated on top of the phosphor.

In a typical X-ray intensifying screen, the powdered, mixed phosphor composition of this invention is adhered to a flexible support such as cardboard or polyester film in a thin layer by means of a suitable binder. The phosphor/binder composition can conventionally contain 85% to about 96% of the phosphor, by weight. The phosphor layer is typically coated onto the support at a wet thickness of about 0.005 inch (0.0127 cm) to about 0.05 inch (0.127 cm). Dispersion of the phosphor in any one of a legion of conventional binders can be accomplished by ball-milling and by other procedures well known in the prior art, for example, U.S. Pat. Nos. 2,648,031; 2,819,183; 2,987,882; 3,043,710; and 3,895,157. Conventional supports which can be used include cardboard, suitably sized or coated, for example, with baryta; cellulose acetate, cellulose propionate, cellulose acetate propionate, cellulose acetate butyrate; poly(vinyl chloride or vinyl acetate); polyamides; metal sheeting, for example aluminum; and poly(ethylene terephthalate), the latter being a preferred support. For use as an X-ray screen, the support must be permeable to X-rays. A thickness of about 0.00025 inch (0.00064 cm) to about 0.30 inch (0.76 cm) is adequate for these supports, with thicknesses of about 0.01 inch (0.025 cm) being preferred.

Figure 1:
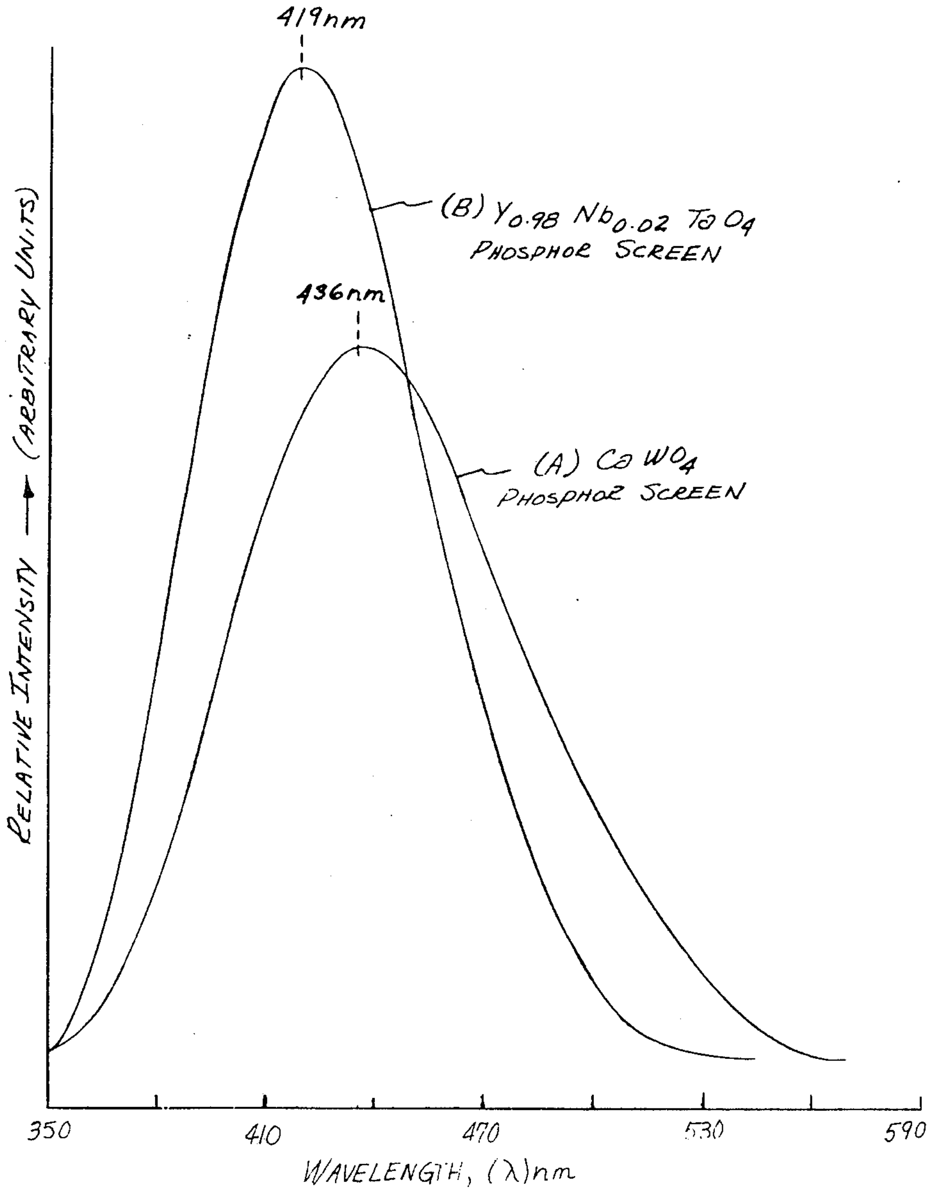
FIG. 1 is an X-ray excited fluorescent emission spectra of $CaWO_4$ and $YTaO_4$:Nb.

Referring now specifically to the drawings, FIG. 1 shows the X-ray excited fluorescent emission spectra of two X-ray screens. Screen (A) is made using $CaWO_4$ as the phosphor while Screen (B) is made using $Y_{0.98}Nb_{0.02}TaO_4$ phosphor. The wavelength is shown in nanometers on one axis and the relative intensity of the output on the second axis. Screen (A) is shown with its maximum emission at 436 nm and Screen (B) at 419 nm with the latter having a greater output.

Figure 2:
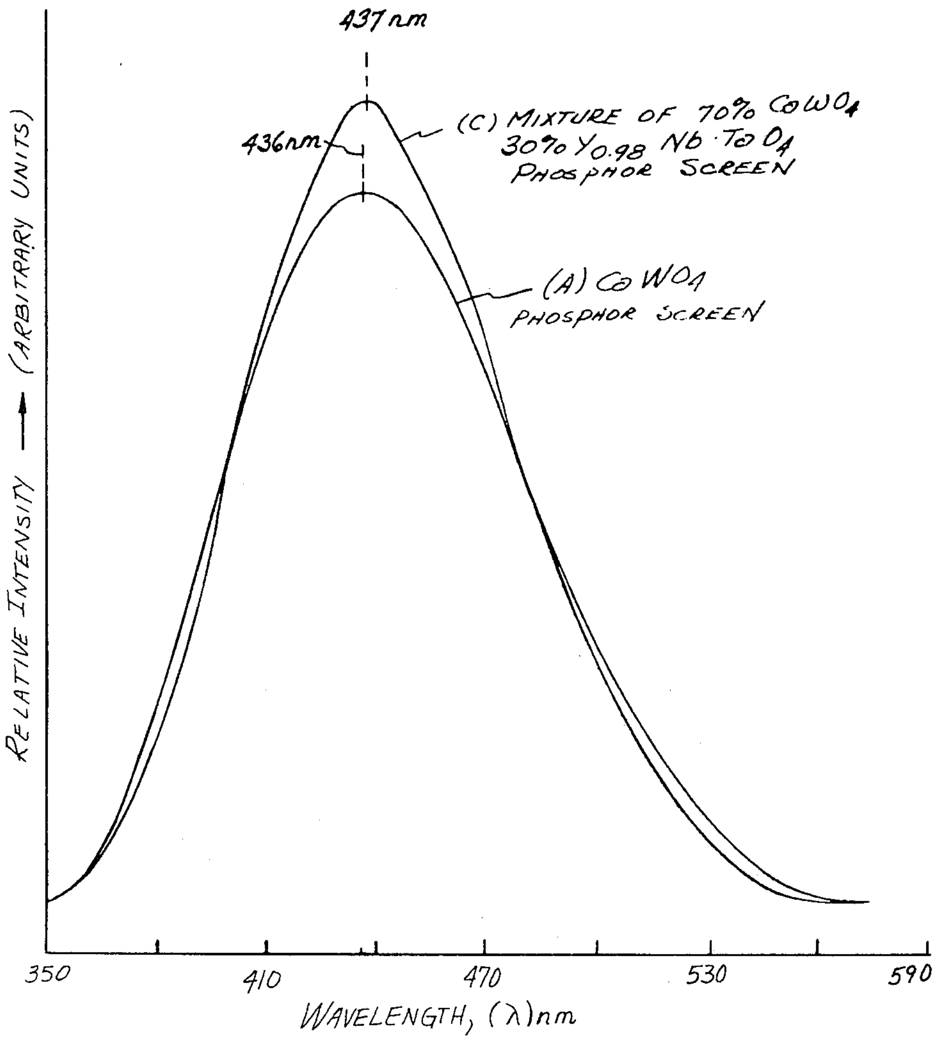
FIG. 2 is an X-ray excited fluorescent emission spectra of $CaWO_4$ and a mixture of $CaWO_4$ and $YTaO_4$:Nb.

FIG. 2 shows the X-ray excited fluorescent emission spectra of two more X-ray screens. Screen (A) is made using $CaWO_4$ phosphor and Screen (C) - representing the phosphor mixture of this invention—is made from a 70:30 mixture of $CaWO_4$:$Yb_{0.98}Nb_{0.02}TaO_4$ phosphors. Screen (A) has a miximum emission at 436 nm and Screen (C) at 437 nm. This is unusual since the emission of $Yb_{0.98}Nb_{0.02}TaO_4$ by itself (see Screen (B) from FIG. 1) is 419 nm. Thus, the mixture exhibits a more desirable maximum, one close to $CaWO_4$ by itself, yet has a higher intensity than $CaWO_4$.

Mixtures of phosphors wherein the amount of $CaWO_4$ is between 25% to about 95% can be used within the ambit of this invention. A mixture of 70% $CaWO_4$ and 30% $Yb_{0.98}Nb_{0.02}TaO_4$ is preferred. A screen made using this particular mixture will have excellent output and a maximum emission close to the desirable $CaWO_4$ emission maximum. More importantly, when used with a suitable silver halide X-ray film element, the film/screen combination exhibits improved speed and sharpness and lower or equivalent noise when compared to conventional film/screen elements having the same speed. These improvements can be achieved using the phosphor of this invention coated at a lower phosphor coating weight compared to prior art phosphors ($CaWO_4$, for example).

This invention will now be illustrated by the following examples in which Example 1 is believed to be the best mode.

EXAMPLE 1

A phosphor suspension is prepared by ball-milling the following ingredients for approximately 16 hours.

| | |
|---|---|
| $CaWO_4$ Phosphor | 3918 g |
| $Y_{0.98}Nb_{0.02}TaO_4$ Phosphor | 1680(1) |
| 13.3% Polyvinylbutyral Binder solution | 2412 |

(1)Made according to Brixner, U.S. Pat. No. 4,225,653, Example 19.

This corresponds to a $CaWO_4$/$YTaO_4$:Nb weight ratio of 70/30.

The binder solution had the following composition:

| | |
|---|---|
| n-Butyl acetate | 6116 g |
| n-Propanol | 6116 |
| 2% Silicone solution(2) | 303 |
| Potassium salt of monoethylphenyl phenol monosulfonic acid | 80 |
| Glycerol monolaurate | 504 |
| Polyvinyl butyral | 2012 |

-continued (2)Polymeric organic silicone fluids, 2% by wt. in toluene; sp. gr. 0.96/20° C.; viscosity at 25° C., 4 to 40 centistokes determined with an Ostwald viscosimeter.

X-ray intensifying screens were prepared by coating the phosphor suspension on a poly(ethylene terephthalate) film support on which a reflective layer comprising rutile $TiO_2$ dispersed in chlorosulfonated polyethylene had already been applied. The reflective layer was about 10 mils (0.004 cm) thick (wet). The suspension was coated over the dried $TiO_2$ reflective layer at a wet thickness of 23.5 mils (0.009 cm) to give a dry phosphor coating weight of approximately 0.73 g per sq. inch. The phosphor layer was overcoated with a cellulose acetate protective coating containing 2% by wt. of $SiO_2$ pigment (4μ mean diameter) at a wet thickness of 10 mils (0.004 cm). The screens were then baked 18 hrs. at 70° C.

The screen prepared as described above was tested by exposure, in conjunction with a portion of conventional, blue-sensitive X-ray film. Two samples of the screen made above were used in this test. The screens were used with X-ray film coated on each side with a conventional, silver halide emulsion. The screens (front and back) were inserted into a cassette with the double-side coated film sandwiched in between so that the phosphor layer from each screen was in contact with an emulsion layer. Exposure was made through a standard step wedge and a resolving power target using an X-ray unit at 80 KVp, 2mAs through a 2 mm aluminum target. The films were then developed, fixed, and washed in a conventional X-ray developing system. For comparison, a standard $CaWO_4$ screen was used as control.

The following radiographic results were obtained:

| Screen | Rel. Speed | Total Noise | Resolution (l/mm) | Image Sharpness | Dry Phosphor Coating Wt. (g/in²) |
|---|---|---|---|---|---|
| $CaWO_4$-Control | 0.98 | 12.2 | 5.0 | 0.225 | 0.385 |
| 70/30-$CaWO_4$/$YTaO_4$:Nb | 1.01 | 13.1 | 5.4 | 0.268 | 0.335 |

This example demonstrates that the screen made from the phosphor of this invention was equivalent to a pure $CaWO_4$ screen but achieved these results at a 13% reduction in phosphor coating weight.

EXAMPLE 2

X-ray screens were prepared in the same manner as described in Example 1 except the cellulose acetate protective coating did not contain the $SiO_2$ roughening agent.

The following radiographic results were obtained:

| Screen | Rel. Speed | Total Noise | Resolution (l/mm) | Image Sharpness | Dry Phosphor Coating Wt. (g/in²) |
|---|---|---|---|---|---|
| $CaWO_4$-Control | 1.00 | 12.9 | 5.6 | 0.254 | 0.385 |
| 70/30-$CaWO_4$/$YTaO_4$:Nb | 1.01 | 12.6 | 6.3 | 0.295 | 0.365 |

This example shows that better results can be achieved with the screen made using the phosphor of this invention compared to a $CaWO_4$ control at about 6% less phosphor coating weight.

EXAMPLE 3

X-ray screens were prepared in the same manner as described in Example 1 with the exception that the weight ratio of $CaWO_4$ to $YTaO_4$:Nb was 90 to 10 and the wet spreading thickness of the phosphor suspension was 33 mils. There was no $SiO_2$ roughening agent added to the protective coating.

The following radiographic results were obtained:

| Screen | Rel. Speed | Total Noise | Resolution (l/mm) | Image Sharpness | Dry Phosphor Coating Wt. (g/in$^2$) |
|---|---|---|---|---|---|
| $CaWO_4$-Control | 1.00 | 11.1 | 4.0 | 0.185 | 0.550 |
| 90/10-$CaWO_4$/$YTaO_4$:Nb | 1.05 | 11.6 | 4.6 | 0.228 | 0.521 |

EXAMPLE 4

X-ray screens were prepared in the same manner as described in Example 1 with the exception that the tantalate phosphor had the composition:

$Y_{0.95}Gd_{0.03}Nb_{0.02}TaO_4$

The phosphor suspension was coated at a wet thickness of 25 mils. It was determined that the mixed phosphor screen had a resolving power of 5.1 line pairs/mm compared to 4.6 line pairs for the $CaWO_4$ control.

EXAMPLE 5

Phosphor suspensions were made as described in Example 1 except for the amount of $Y_{0.98}Nb_{0.02}TaO_2$ which was varied as follows:

| Screen Sample | Amt. $YTaO_4$:Nb (wt. %) |
|---|---|
| A | 0 - Control |
| B | 25 |
| C | 50 |
| D | 75 |
| E | 100 |

These suspensions were coated on $TiO_2$ reflective layers on poly(ethylene terephthalate) film supports at a wet coating thickness of ca. 30 mils (0.012 cm) and overcoated with the protective coating of Example 1. The following radiographic results were obtained:

| Sample | Rel. Speed | Resolution (l/mm) |
|---|---|---|
| A | 1.56 | 5.40 |
| B | 1.45 | 5.10 |
| C | 1.34 | 5.35 |
| D | 1.22 | 4.34 |
| E | 1.10 | 4.63 |

This experiment demonstrates that successful results can be obtained at varying levels of $YTaO_4$:Nb.

EXAMPLE 6

In order to demonstrate that a mixture of phosphors is necessary in the ambit of this invention, separate screens were made up containing either (A) 100% $CaWO_4$ or (B) 100% $Y_{0.98}Nb_{0.02}TaO_4$ phosphors. The phosphors were dispersed in a binder as described in Example 1 and each dispersion was coated on a $TiO_2$ reflective layer coated on a poly(ethylene) terephthalate film support as described in Example 1. A protective coat was applied over each phosphor layer and the combination was tested with a double-side emulsion coated X-ray silver halide element. Although the combination had excellent speed, it was noisier than a pair of screens having the mixture of Example 1 (e.g. 70/30 $CaWO_4$/$YTaO_4$:Nb).

EXAMPLE 7

Phosphor suspensions were made as described in Example 1 except that $YTaO_4$ without activator was used in place of $Y_{0.98}Nb_{0.02}TaO_4$. The mixture was varied as follows:

| Screen Sample | Amt. $YTaO_4$ (wt. %) |
|---|---|
| A | 20 |
| B | 30 |
| C | 40 |

These suspensions were coated as previously described (Example 5, 23.5 mils wet coating weight), overcoated, and tested as described in Example 1, with the following results:

| Sample | Rel. Speed | Resolution (l/mm) |
|---|---|---|
| A | 1.05 | 5.8 |
| B | 1.06 | 6.0 |
| C | 1.08 | 6.4 |
| $CaWO_4$-Control | 1.00 | 5.6 |

I claim:

1. An X-ray intensifying screen comprising a support, a phosphor mixture on said support, and a binder for said phosphor mixture, characterized in that said phosphor mixture consists essentially of calcium tungstate and a rare earth tantalate having the monoclinic M' structure and selected from the group consisting of:

(a) $YNb_xTaO_{1-x}O_4$, where x is 0 to about 0.15;

(b) $LuNb_xTa_{1-x}O_4$, where x is 0 to about 0.20;

(c) $Y_{1-y}Tm_yTaO_4$, where y is 0 to about 0.30;

(d) a solid solution of (a) and (b); and, (e) a solid solution of (a) and (c) wherein the rare earth tantalate is present in an amount of 5% to 75% by weight.

2. The X-ray screen of claim 1 wherein the phosphor mixture is $CaWO_4$/$YTaO_4$:Nb in a 70/30 ratio in % by wt.

3. The X-ray screen of claim 1 wherein the phosphor mixture is $CaWO_4$/$YTaO_4$:Nb in a 90/10 ratio in % by wt.

* * * * *